(12) United States Patent
Gaj

(10) Patent No.: US 10,132,300 B2
(45) Date of Patent: Nov. 20, 2018

(54) ACTUATOR DEVICE

(71) Applicant: ELTEK S.P.A., Casale Monferrato (AL) (IT)

(72) Inventor: Renato Gaj, Casale Monferrato (IT)

(73) Assignee: ELTEK S.P.A., Casale Monferrato (AL) (IT)

(*) Notice: Subject to any disclaimer, the term of this patent is extended or adjusted under 35 U.S.C. 154(b) by 1183 days.

(21) Appl. No.: 14/225,121

(22) Filed: Mar. 25, 2014

(65) Prior Publication Data

US 2014/0292139 A1 Oct. 2, 2014

(30) Foreign Application Priority Data

Mar. 27, 2013 (IT) ............................... TO2013A0254

(51) Int. Cl.
*F03G 7/06* (2006.01)

(52) U.S. Cl.
CPC ..................................... *F03G 7/06* (2013.01)

(58) Field of Classification Search
CPC .......... F03G 7/06; F03G 7/065; F15B 15/065; F16K 31/002; F16K 31/53; F16K 31/54; E05B 2047/0014; E05B 2047/0079; E05B 2047/0081; H01H 2061/0122
See application file for complete search history.

(56) References Cited

U.S. PATENT DOCUMENTS

| | | | | |
|---|---|---|---|---|
| 3,190,190 A | * | 6/1965 | Rudd | F15B 15/065 92/110 |
| 6,003,431 A | * | 12/1999 | Bertini | F15B 15/24 91/405 |
| 7,063,092 B2 | | 6/2006 | Cerruti | |
| 2003/0197387 A1 | | 10/2003 | Dirnberger | |
| 2003/0206497 A1 | * | 11/2003 | Miyazawa | F03G 7/06 368/204 |
| 2005/0249836 A1 | * | 11/2005 | Wang | B29C 45/1615 425/576 |
| 2006/0243935 A1 | * | 11/2006 | Hoch | F15B 13/0803 251/58 |
| 2007/0050796 A1 | * | 3/2007 | Kubo | F03G 7/065 720/658 |

(Continued)

FOREIGN PATENT DOCUMENTS

| | | |
|---|---|---|
| DE | 198 46 863 A1 | 4/2000 |
| EP | 1 703 212 A2 | 9/2006 |

(Continued)

OTHER PUBLICATIONS

Search Report dated Dec. 13, 2013, issued in Italian Application No. TO20130254, filed Mar. 27, 2013.

*Primary Examiner* — Jonathan Matthias
(74) *Attorney, Agent, or Firm* — Workman Nydegger

(57) ABSTRACT

A device is described wherein a pair of thermal or electro-thermal actuators (3, 4; 103, 104) actuate a member, such as a pinion (5), between two stable positions. The actuators are alternately activated for moving the pinion between the stable positions. For this purpose, they are arranged close to each other, so that they can act upon the pinion on opposite sides, the pinion being held in the stable positions by a releasable engagement element. The device of the invention ensures low energy consumption because the actuators (3, 4) operate only for moving the pinion from one stable position to the other.

22 Claims, 19 Drawing Sheets

(56) References Cited

U.S. PATENT DOCUMENTS

2013/0205779 A1\* 8/2013 Lucas ..................... F02G 1/02
60/643

FOREIGN PATENT DOCUMENTS

| EP | 2 450 510 A2 | 5/2012 | |
|---|---|---|---|
| GB | 2095338 A \* | 9/1982 | ............... F03G 7/06 |
| WO | 2013/001556 A1 | 1/2013 | |

\* cited by examiner

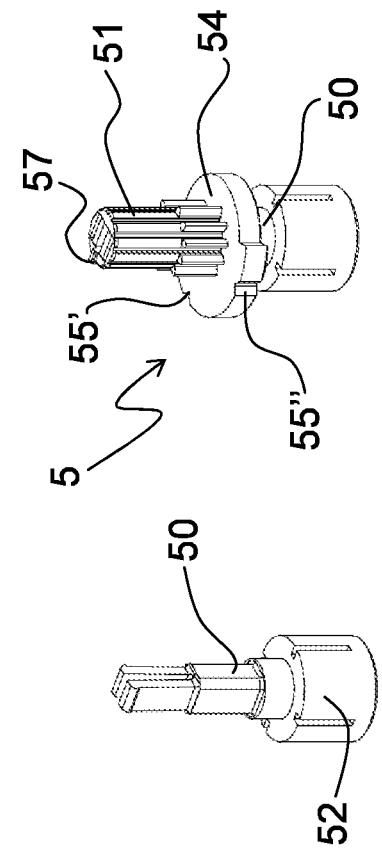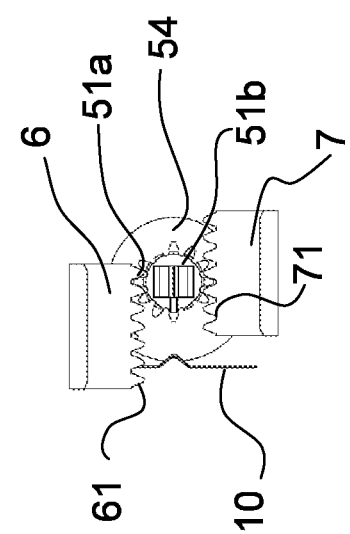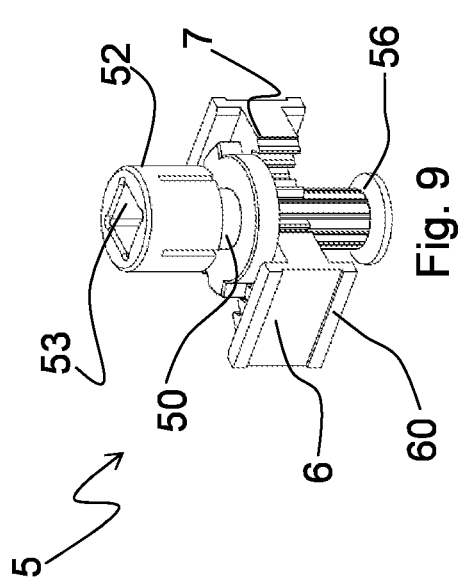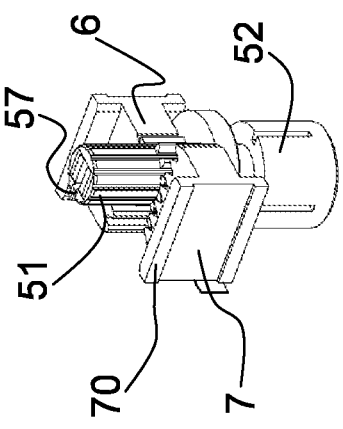

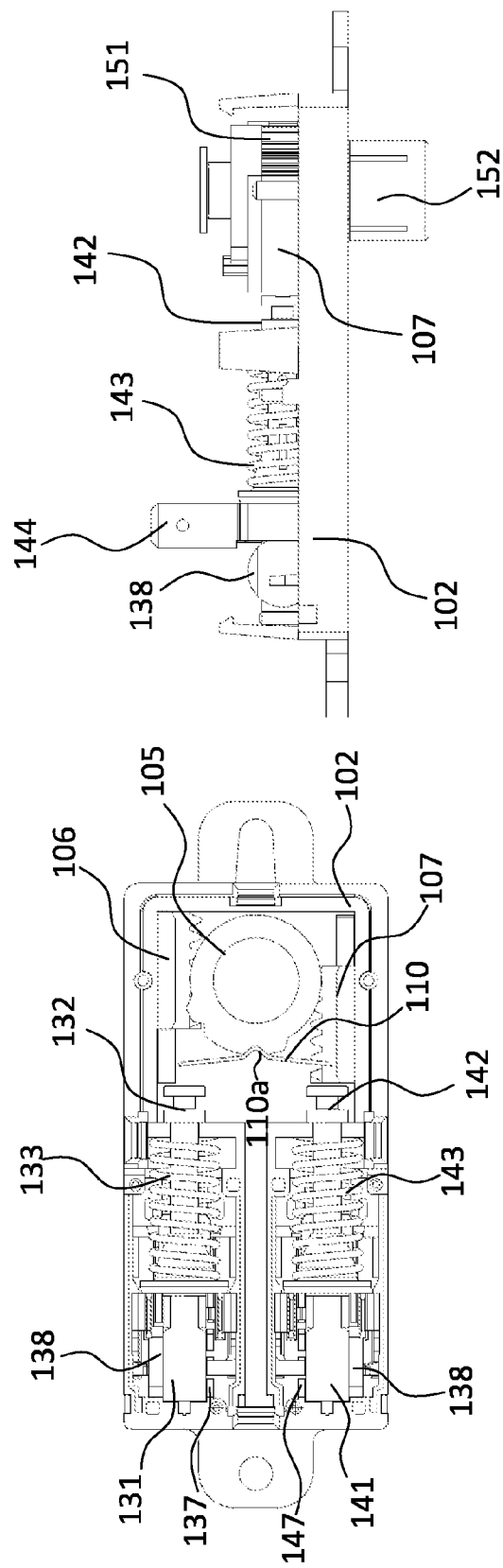

ACTUATOR DEVICE

CROSS-REFERENCE TO RELATED APPLICATIONS

This application claims priority to Italian Application No. TO2013A000254, filed Mar. 27, 2013, which application is incorporated herein by specific reference.

BACKGROUND OF THE INVENTION

1. The Field of the Invention

The present invention refers to an actuator device with stable working positions.

2. The Relevant Technology

As is known, in order to control some components of apparatuses in general, such as household appliances, automatisms, vehicles, conditioners and the like, whose the operation is controlled either remotely (by means of control units or remote controls) or manually, actuators are used which may be of various kinds: electromechanical, thermoelectric, magnetic, hydraulic, etc.

Some of these actuators are cylinder-piston systems, wherein a movable part (either the cylinder or the piston, as the case may be) moves linearly and exerts a force on a mechanical member to be controlled.

The latter may be of any kind, shape and size, e.g., the door that closes a container, the gate of a valve, the flap of a ventilation system, and so on.

In this description and in the appended claims, reference will prevalently be made, for simplicity, to thermal or electrothermal actuators, or thermoactuators, which will be briefly discussed later on, it being understood that the invention is also applicable to other actuator types, since it is compatible therewith.

In the light of this introduction, the present invention can be said to relate, from a more particular point of view, to actuator devices with stable working positions, the latter being positions taken in specific conditions such as, for example, those for closing or opening doors, flaps and the like, as mentioned above, and/or positions held in the absence of thermal excitation and/or electric power.

In order to keep these stable conditions, abutment elements are usually employed, i.e., elements such as protrusions, shoulders or strikers, which stop the travel of the movable part of the actuator.

In such condition, the latter is kept operational by power supplied thereto or otherwise, so that it can exert the force necessary for controlling the member with which it is associated.

One example of a known actuator device designed as explained so far is described in American patent U.S. Pat. No. 7,063,092, the holder of which is the same Applicant of the present application.

This device uses a per se known monostable thermoactuator or thermoelectric actuator, such as an actuator with a metallic body, comprising a wax or another heat-expandable material, and a slidably inserted movable shaft or piston, which is moved by the wax expanding when heated by an electric resistor, subject to the elastic reaction of a spring for repositioning the movable shaft or piston when the electric supply or excitation stops.

A rack is associated with said known monostable thermoelectric actuator, which engages with a pinion whose rotations, imparted by the alternating linear motion of the rack, are used for opening and closing the door of a washing agent dispenser of a household appliance, such as a dishwasher or the like.

In particular, the dispenser opens at the end of the forward stroke of the thermoactuator's piston, and this condition is maintained for a preset time interval, so as to allow the wash water of the dishwasher to clean the dispenser compartment of all residues of the agents contained therein.

During this time interval, the thermoactuator or thermoelectric actuator is electrically powered to exert the force required for holding the dispenser open, and only at the end of this interval it is de-energized in order to close the dispenser.

As can be easily understood, such a solution, though efficient in opening and closing the dispenser, is not equally efficient from the energetic viewpoint, in that the thermoelectric actuator continues to draw electric current throughout the actuation time, i.e., as long as it is held in a second position other than a first idle position.

This may not be satisfactory because, as is the case of the latest household appliances, for example, very restrictive conditions must be complied with as far as energy consumption is concerned; the same applies to the case wherein a great force must be exerted on the member controlled by the actuator, since the large amount of power required by the actuator for long periods of time may turn out to be costly and/or harmful, resulting in the risk of premature failure of the actuator itself.

Let us consider, in fact, that the internal pressure of some thermoactuator versions may be as high as some hundreds of bar, or even in excess of 1,000 bar, resulting in the structure being subject to high mechanical stresses further increased by concurrent thermal stresses, which may vary depending on the actuator's heating or energization time.

SUMMARY OF THE INVENTION

The technical problem underlying the invention is therefore to provide an actuator device which overcomes the drawbacks affecting those known in the art, previously referred to.

The idea for solving this problem is to provide a multiple-actuator device, preferably, without being limited to, a dual-actuator device, associated with means for stopping and/or engaging and/or holding the member on which the actuator exerts a force; preferably, said member is a pinion or anyway a rotary or angularly-movable member, wherein said member may also be a rack or a sliding member or a movable member associated in a substantially linear manner with a rotary or angularly-movable element.

It should be considered that said movable member, provided with stopping and/or engaging and/or holding means, is also equipped with means adapted to transmit motion, such as the teeth of said pinion and/or of said rack, or other coupling or transmission means between rotary elements and sliding or linearly-moving elements, such as surfaces adapted to be coupled to each other by friction.

The main features of the actuator device according to the invention are specifically set out in the claims appended to this description.

BRIEF DESCRIPTION OF THE DRAWINGS

Further objects and features of the invention, as well as the effects and advantages deriving therefrom, will become more apparent from the following description referring to some preferred but non-limiting examples of embodiment, as schematically shown in the annexed drawings, wherein:

FIGS. 9, 10 and 11 and 12 and 13 are perspective views, from respective angles, of some details of the device of FIGS. 5 and 6;

FIGS. 24 and 25 show a plan view and a side view of the device of FIG. 22;

DETAILED DESCRIPTION OF THE PREFERRED EMBODIMENTS

Figure 1:
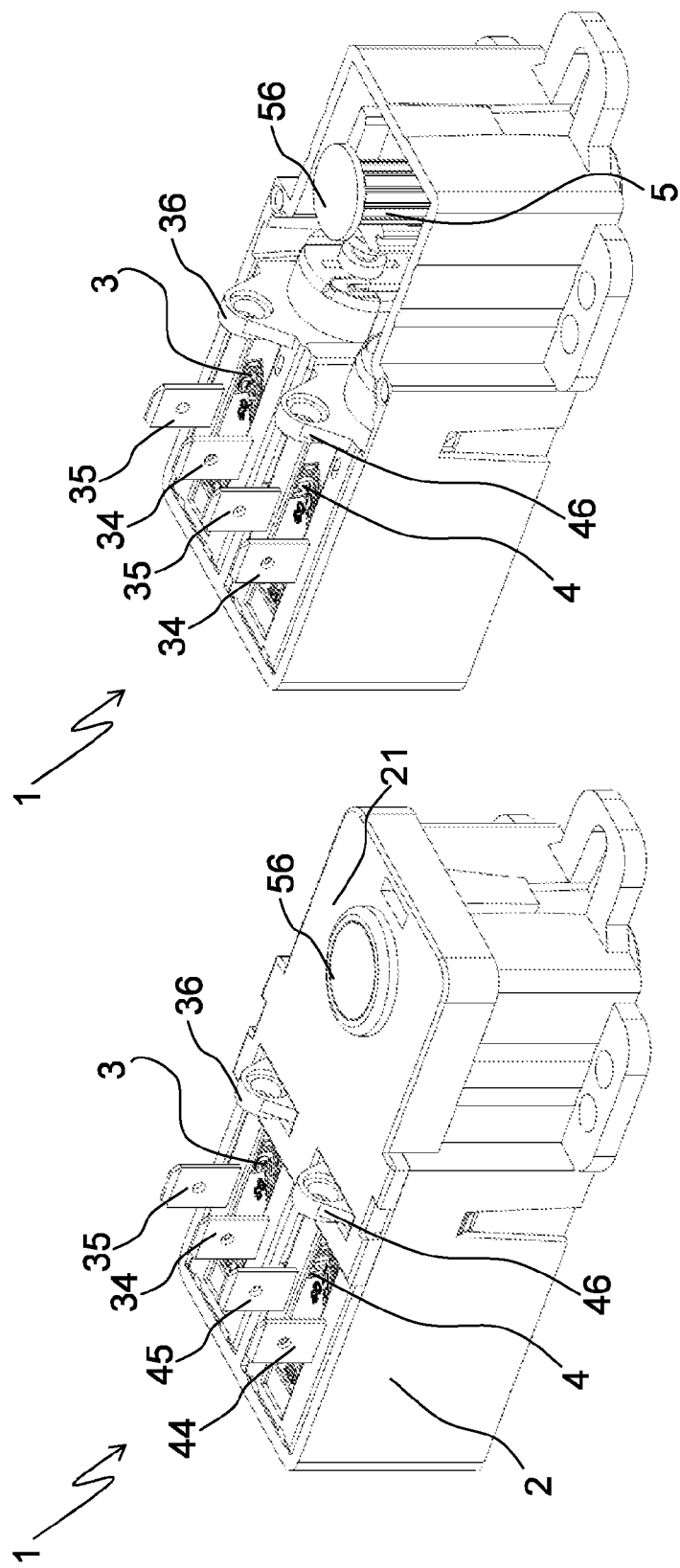
FIGS. 1a, 1b are perspective views of an actuator device according to the invention, respectively with and without the top cover.

It must be pointed out that terms such as "high", "low", "upper", "side" and the like, mentioned in the description, refer to the arrangements shown in the annexed non-limiting drawings, and as such they have an exemplary and non-limiting character; furthermore, any special shape, structure or feature described herein may be appropriately combined into one or more "embodiments", even different from those illustrated and/or described, and the references used herein only aim at better clarity and convenience, without limiting the protection scope or the extent of the various implementations.

In this description, definitions such as "embodiment" indicate that at least one particular configuration, structure or feature described in relation to that specific embodiment or example is comprised in at least one possible implementation of the invention; therefore, phrases such as "in an embodiment" and the like, which may occur several times in this description, will not necessarily refer to the same embodiment or implementation of the invention.

With reference to the above-listed FIGS. 1 to 16, there is shown a first embodiment of the actuator device according to the invention, designated as a whole by reference numeral 1.

The device comprises a shell or outer housing part 2 for arranging at least some of its components, which include a pair of thermal or electrothermal actuators 3, 4, hereafter also referred to, for brevity, as thermoactuators.

From a general viewpoint, the thermoactuators 3, 4 comprise a metallic and/or thermally conductive body, with a chamber containing a heat-expandable material (such as, for example, wax) and a thrust element, which is adapted to move a shaft or stem coming out of the outer housing 2, on which elements for closing and sealing the chamber are mounted.

Preferably, said thrust element is made of metal and is at least partly in contact with said expandable material.

The thermoactuators 3, 4 preferably comprise also an insulating housing and a thrust element, substantially in the form of a shaft or stem, e.g., made of insulating plastic material, and are associated or fitted with an electric heater, typically consisting of a positive temperature coefficient (PTC) resistor, electrically powered at least by respective terminals; it is also conceivable that there is at least one common electric terminal for both thermoactuators 3, 4.

When there is voltage across the power terminals, the electric heater being run through by current generates heat and causes the heat-expandable material to expand: such expansion, in turn, causes the thrust element to move linearly towards the outside of its body, so as to move the shaft or stem up to a predetermined second working position, which is generally defined by a mechanical abutment element.

When no longer supplied with electric power, the heater cools down and the heat-expandable material contracts again, thereby causing the head of the thrust element to return inside to the initial idle position, possibly with the aid of an elastic return element, such as a spring.

Thermoactuators of the above-mentioned type are therefore monostable linear actuator devices, meaning by this that they allow to obtain a travel to a final working position only as long as they remain electrically powered and/or thermally excited, whereas when said electric power and/or thermal excitation stop they will return to their normal idle position. The most important advantages offered by such a typology of actuators are the great force or working power that they can develop notwithstanding their small dimensions, low cost, low consumption and quietness of operation.

Figure 16:
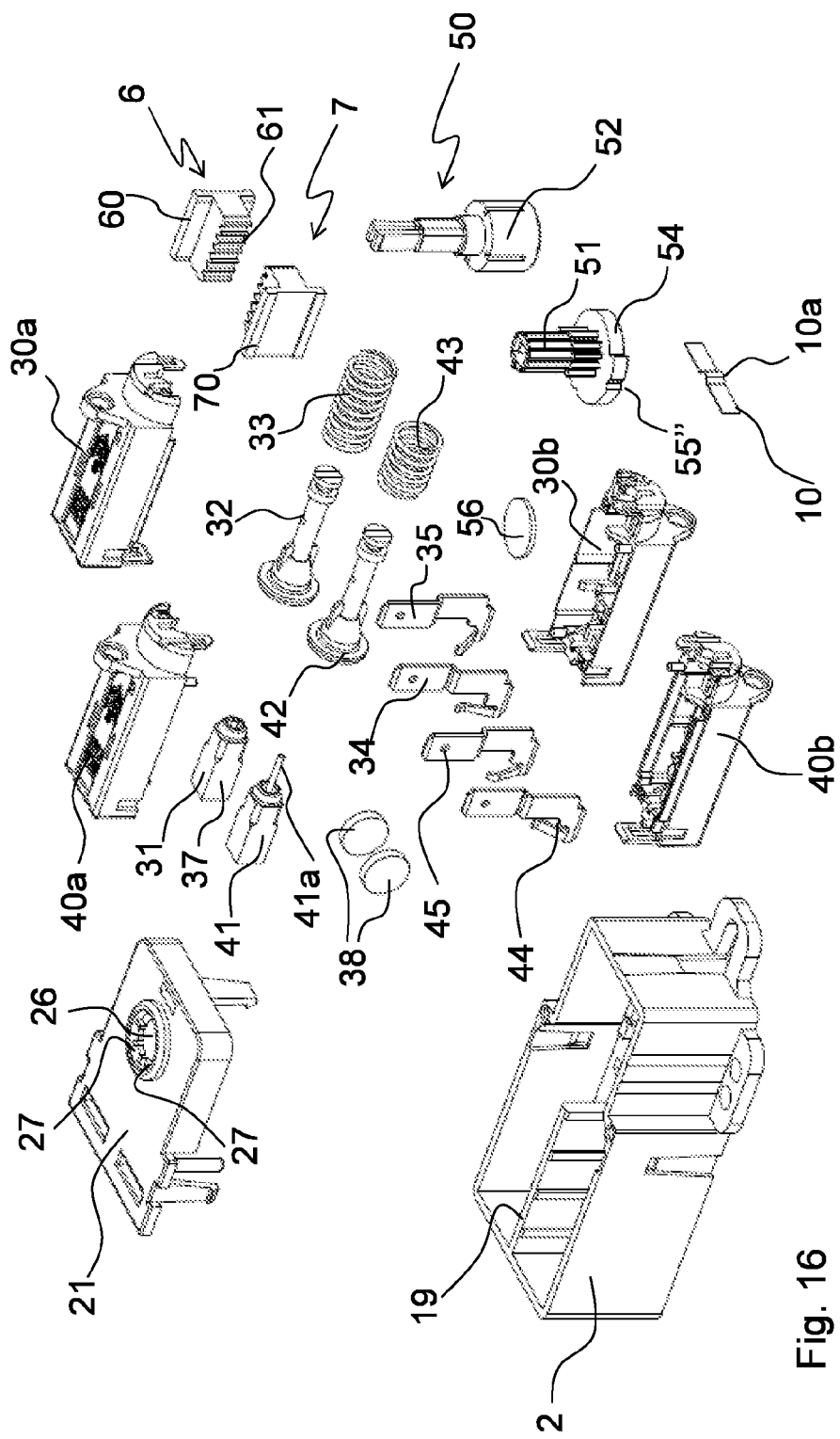
FIG. 16 is an exploded view of the device of the preceding Figures.

As clearly shown in FIG. 16, each actuator 3, 4 comprises a housing of its own consisting of two external half-bodies 30a, 30b; 40a, 40b accommodating the thermal assembly 31, 41, which contains the expandable wax; each actuator preferably comprises fastening means, consisting in this example of symmetrical fastening flanges 36, wherein each fastening element or flange 36 is preferably formed in a respective half-body 30a, 30b; 40a, 40b.

Each thermal assembly 31, 41 exerts a thrust on a corresponding stem or shaft 32, 42 coupled thereto; for this purpose, each assembly comprises a thrust element 31a, 41a, which is activated by the heat-expandable material M contained in the respective chamber 31b, 41b of the body 31c, 41c of the assembly, thus coming out of the assembly and pushing the stem 32, 42 forwards.

The stem 32, 42 has an elongated shape and is associated with a spring 33, 43, useful to ensure the elastic return of the corresponding actuator 3, 4 into the idle condition when it is turned off and the wax therein has cooled down; the spring 33, 43 pushes said stem 32, 42, which in turn pushes the thrust element 31a, 41a towards the inside of the chamber 31b, 41b.

To this end, the actuators 3, 4 are preferably equipped with at least one respective pair of electric terminals 34, 35; 44, 45 to be connected to a power supply source, as is the case of household appliances, for example, wherein the actuator device 1 according to the invention can be used to advantage.

The thermoactuators 3, 4 are arranged side by side or parallel to each other inside the shell 2, in particular with their respective axes and/or working directions defined by the direction of movement of the stems 32, 42 and/or of the racks 6, 7, preferably with the fastening flanges 36 projecting upwards and downwards and extending through respective apertures 20 provided on the cover 21 that closes the shell 2 and on the bottom of the latter; said fastening element 36 of the thermoactuators 3, 4 may however be absent or be of a different type, resulting in a different coupling or engagement with the housing or shell 2.

According to the non-limiting example shown in the drawings, the shell 2 has a wider rear portion 2a that houses the thermoactuators 3, 4 and a front portion 2b that houses a rotary or angularly-movable transmission member, called pinion 5 for simplicity.

The latter, as can be clearly seen in FIGS. 9-13, advantageously consists, in this embodiment, of a first central element or pin 50 for supporting and/or fitting a toothed wheel 51; it should be considered that said toothed wheel 51 may have teeth on only a portion of its circumference, preferably on two or more portions, thus being divided into distinct sectors as shown in the drawings (FIGS. 11-15), wherein the circumference of the toothed wheel 51 comprises two opposite or specular or semicircular sectors 51a, 51b.

The pin 50 of the pinion 5 has a base 52, preferably having a greater diameter than the pin itself and/or than the toothed wheel 51, within which a coupling or fitting element 53, such as a polygonal or square cavity 53, is formed for coupling the rotary pinion 5 to an output shaft or another member driven by the externally associated actuator device 1 (not shown in the drawings), such as a shaft having at least one end with a shape complementary to the seat 53, e.g., polygonal or square.

The toothed wheel 51 has, at one end thereof facing the base 52 of the pin 50, a disk or stop element 54, the edge of which has a series of cutouts or seats 55', 55" the function of which will be described in detail later on.

Preferably, in the cover 21 a seat 26 is formed for housing an insert 56 of the cover 21; in accordance with a preferred embodiment, said insert is made of transparent material, such as a transparent thermoplastic material or glass, to allow seeing or checking from outside the cover 21 the angular position of the upper end of the pinion 5 and/or of the toothed wheel 51. To this end, suitable notches or protuberances or references 27 are also present at the periphery of or inside the seat 26 of the cover 21, which cooperate with a reference provided on the pinion 5 and/or on the toothed wheel 51 to indicate the angular position thereof.

For example, a reference on the pinion may consist of a suitable notch 57 or protuberance, or possibly an excitation element for a position sensor.

Said excitation element may be, for example, a cam element, in particular for exciting an electric contact, or a magnetic element or a permanent magnet, in particular for exciting a magnetic detection sensor, or a reflective element, or an element adapted to interrupt or divert an optical beam, in particular for exciting an optical detection sensor.

The position of the pinion 5 may advantageously be detected through the transparent insert 56, whether visually or through optical means (e.g., photocells, luminous rays, etc.), not shown in the drawings, particularly for making checks during the production stages and/or in operation.

According to one possible variant, said insert 56 acts as a support element and/or thrust bearing element for the upper end of the pinion 5 and/or of the toothed wheel 51, being preferably made of self-lubricating material to facilitate the rotation of the pinion 5 during the operation of the device 1.

It must however be pointed out that the insert 56 may be absent, and the upper end of the pinion 5 and/or of the toothed wheel 51 may pass through or be housed in said seat 26, so as to be visible and/or detectable from the outside.

Figure 17:
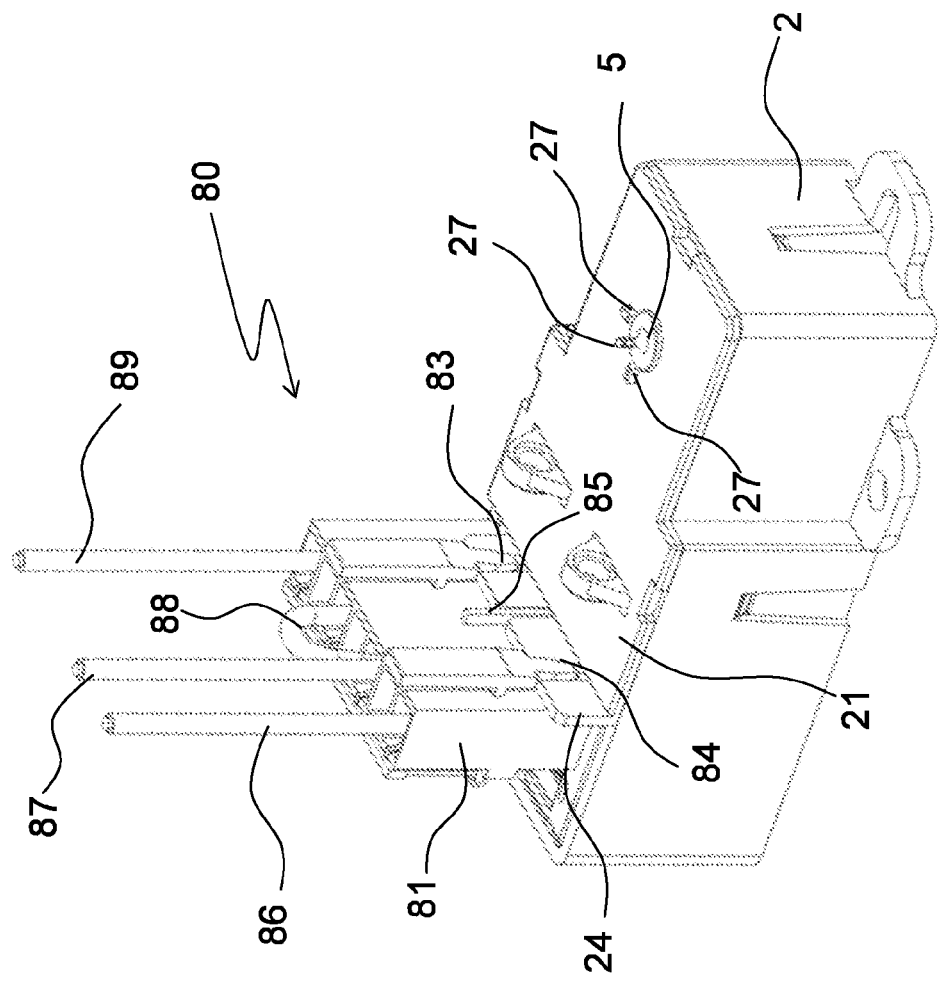
FIG. 17 is a perspective view of a first variant of the device of the preceding Figures.
Figure 18:
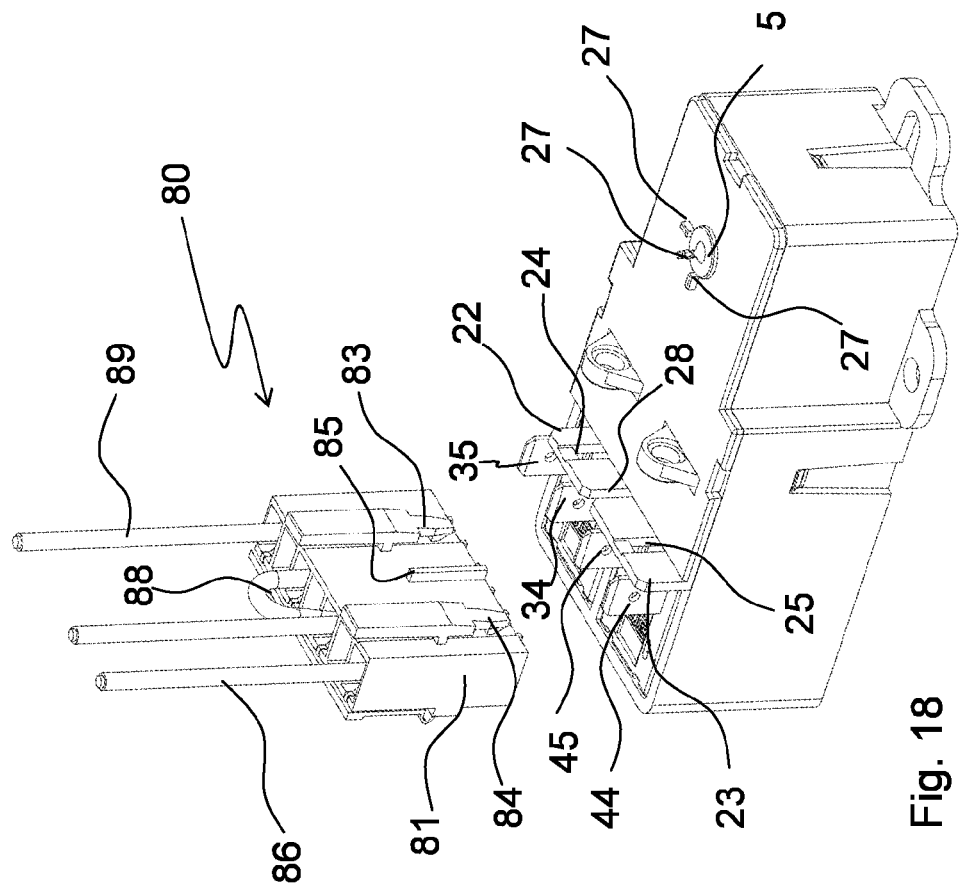
FIG. 18 is a view of the device of FIG. 17 with the parts thereof detached from each other.
Figure 18A:
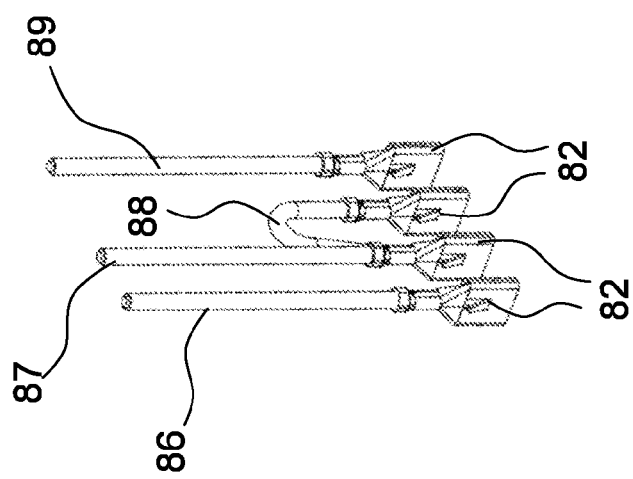
FIG. 18a shows an internal detail of a part of FIG. 18.
Figure 19:
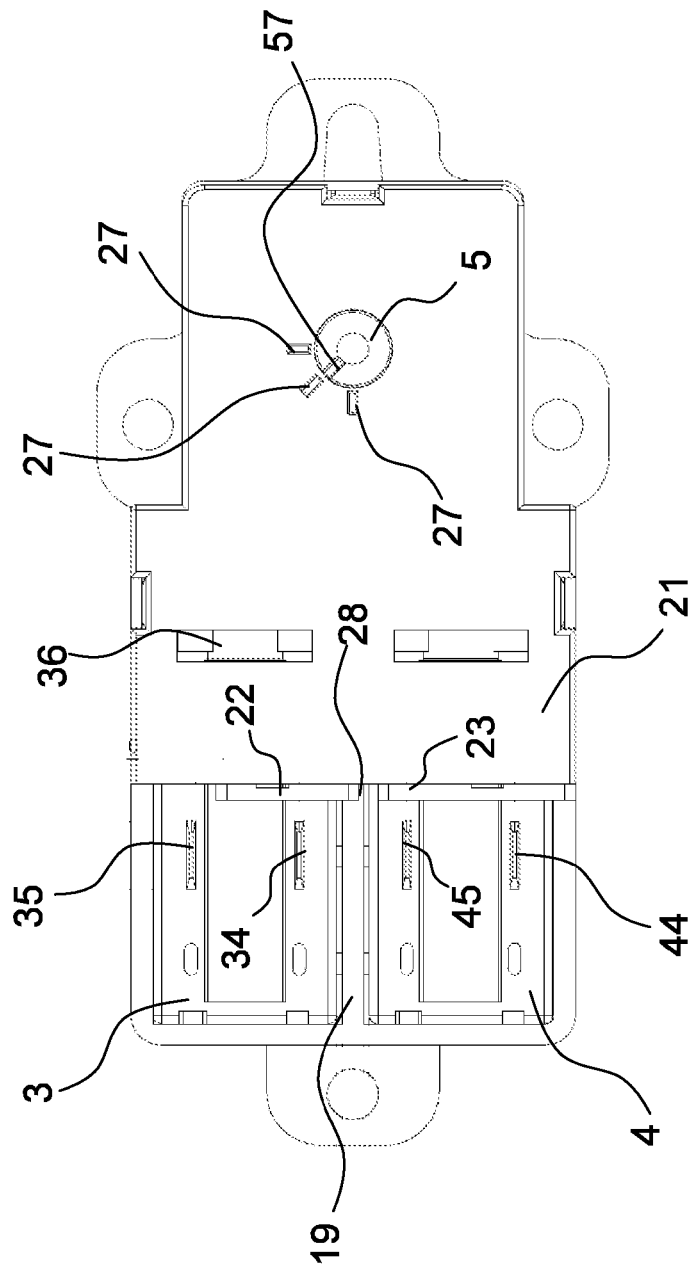
FIG. 19 is a plan view of the device of FIG. 17, 18.
Figure 21:
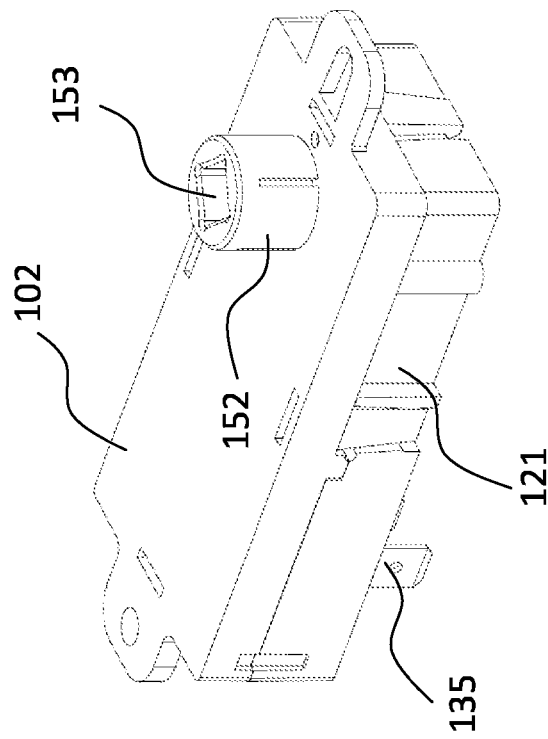
FIGS. 20 and 21 are perspective views, respectively from the top and from the bottom, of a second variant of the device according to the invention.
Figure 20:
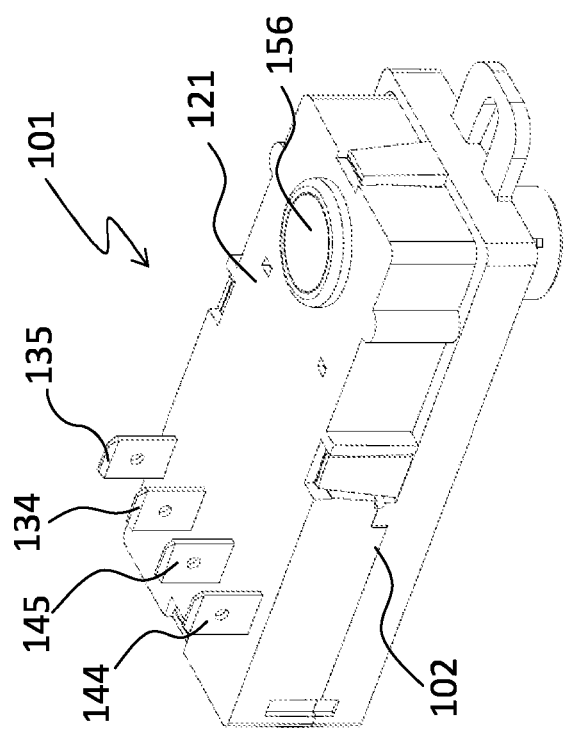
Figures 22, 23:
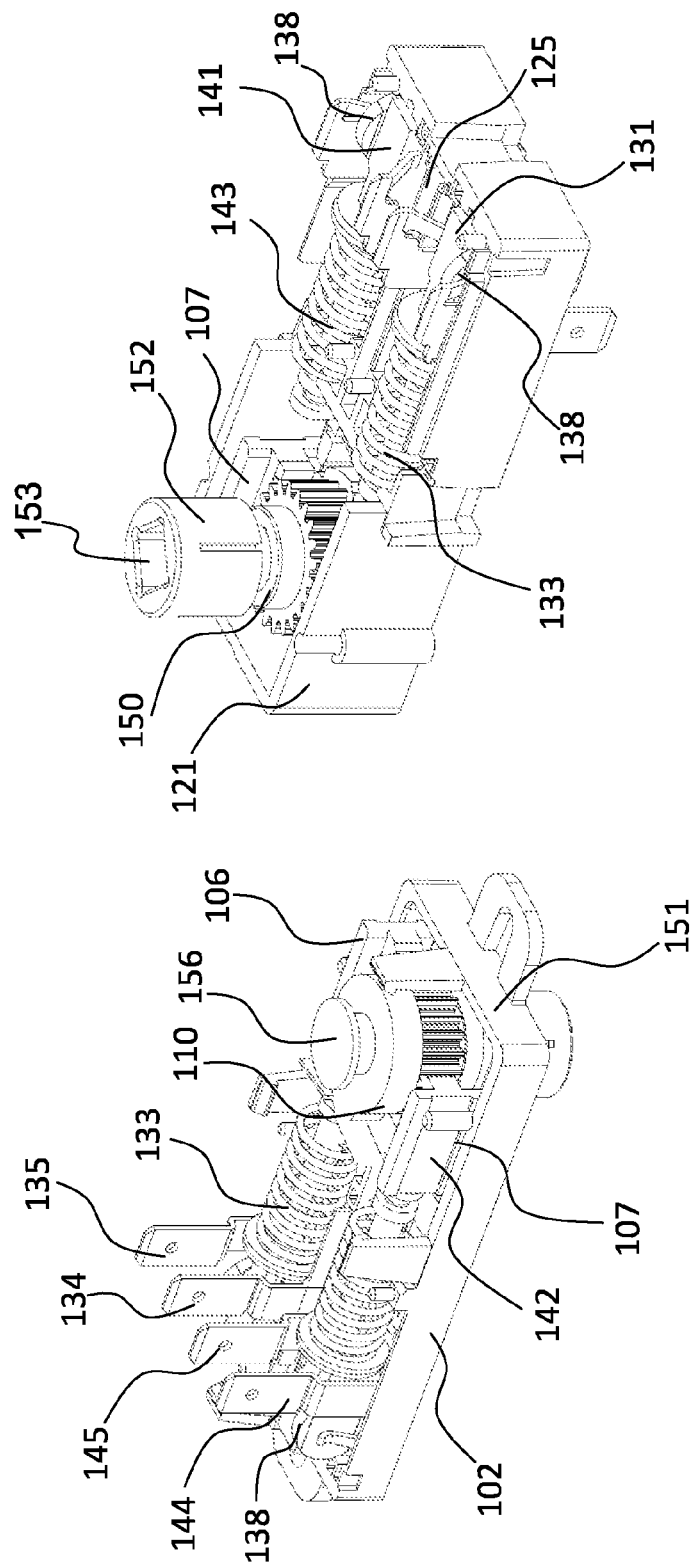
FIGS. 22 and 23 show the variant of the device of FIGS. 20 and 21, with a part removed to make the internal parts visible.
Figure 27:
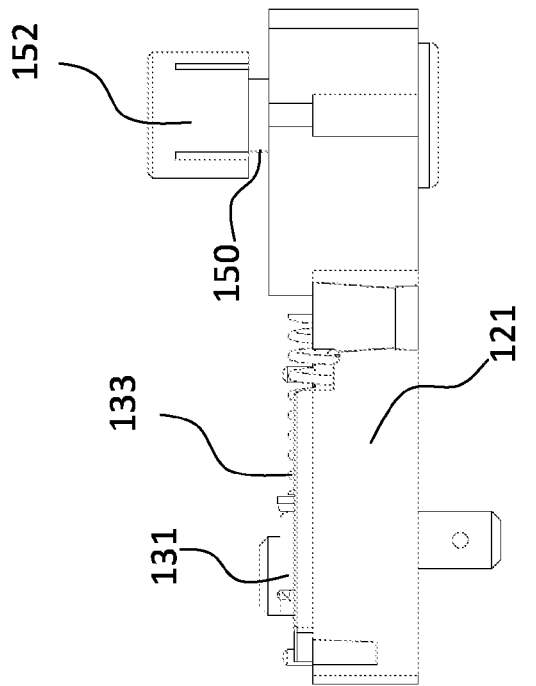
FIGS. 26 and 27 show a plan view and a side view of the detail of FIG. 23.
Figure 26:
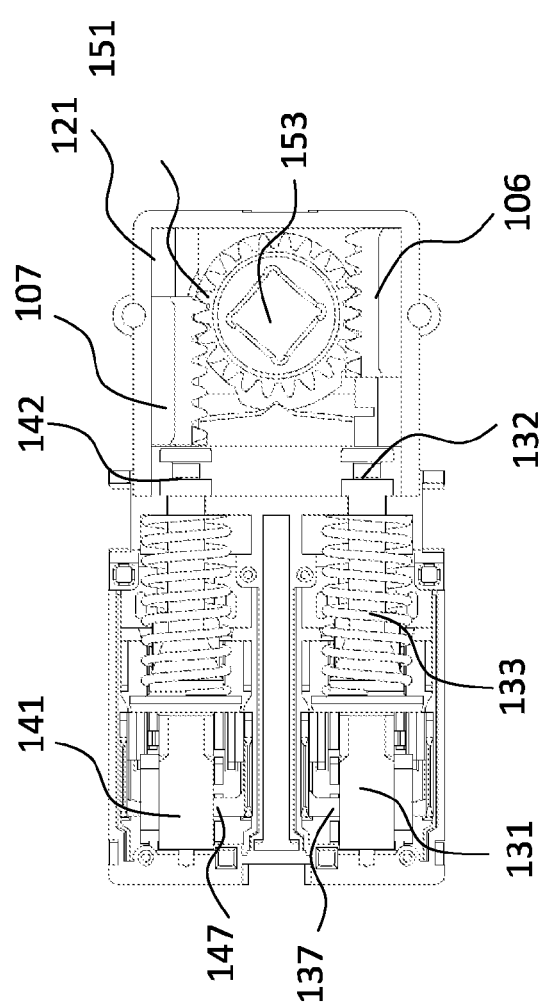

In this solution, shown in FIGS. 17 to 19, the notch 57 on the pinion 5 or on its toothed wheel 51 provides an immediate indication about the position taken with respect to the references 27 around the seat 26 of the cover 21.

The variant of FIGS. 17 to 19 also shows an advantageous configuration of the electric terminals 34, 35 and 44, 45, in particular male terminals, in which configuration they are equally spaced by a predetermined pitch, thus being compatible with an electric connector 80 of a wiring of the user apparatus.

It is worth mentioning that this particular spacing of the electric terminals is applicable to all possible embodiments of the present invention described herein, not just to the one shown in FIGS. 17-19: the teaching of arranging the electric terminals 34, 35 and 44, 45 in such a way as to make them connector-compatible, in fact, is not dependent on the fact that the seat 26 on the cover 21 houses one end of the pinion 5 or a transparent insert 56.

In the light of this consideration, therefore, the connector 80 is preferably complementary with the electric terminals 34, 35 and 44, 45.

Advantageously, the connector 80 comprises an external structure 81 that houses female electric terminals 82, which structure comprises engagement means 83, 84 to be engaged with wings or protuberances 22, 23 present on the cover 21 of the device; said wings 22, 23 thus constitute at least a portion of the engagement means of the housing 21, which portion forms at least part of the housing of the electric connector 34,35,44,45 of the device 1 according to the invention.

In this case, the engagement means consist of hook-shaped heads 83, 84, which, when the connector 80 is applied to the device 1, will engage into respective engagement slots or seats 24, 25 of the wings 22, 23.

The housing part 22, 23 of the electric connector 34,35, 44,45 of the device 1 preferably also comprises means 28 for providing a univocal and/or coded coupling with respect to said electric connector 80: thanks to this provision, one can only apply the proper connector 80 for the device 1.

In order to guide and/or make univocal the coupling of the connector 80, said wings 22, 23 comprise and/or are separated by a seat 28, which acts as a guide and/or key or coding for a respective rib 85 provided on the structure 81 of the connector 80.

It must however be pointed out that said seat 28 and/or said slots 24, 25 may be multiple and/or defined in various positions of the wings or protuberances 22, 23, or may be so arranged as to form univocal coding and/or coupling elements, in order to ensure a univocal coupling between the electric terminals 34, 35 and 44, 45 of the device 1 and the connector 80 of the wiring, or to only allow the connection to be made if the connector 80 has the same coding as the device 1, i.e., only by using the proper connector.

The terminals 82 are associated with respective electric conductors or wires 86, 87, 88, 89 of the electric wiring of the system in which the device of the invention is installed; in the example of FIG. 17-19, the central pair of terminals 82 are connected to each other by a conductor 88, so that the thermoactuators 3, 4 are powered independently with a wire or connection in common.

This is one possible solution, but it should be noted that the terminals 82 may also be connected in a different manner.

The equal spacing of the electric terminals 34, 35, 44, 45 allows, in practice, to connect the device of the invention to respective connectors 80 having the same pitch or distance between the terminals, where the device according to the invention may be connected through alternate terminals (every other terminal) of the connector 80.

In particular, in accordance with a preferred embodiment of the invention, the distance between the two thermoactuators 3 and 4 determines also the distance between the terminals 34, 45, and is so predefined as to equal the distance between the terminals 34, 35 and 44, 45 of each thermoactuator 3, 4.

In other words, the distance between the thermoactuators 3, 4 is such as to ensure that all the electric terminals 34, 35, 44, 45 are equally spaced by the same pitch.

In this context, the thermoactuators 3, 4 preferably have flat terminals 34, 35 and 44, 45, having a width in the range of 6.1 to 6.5 mm, preferably equal or close to 6.3 mm, and a thickness in the range of 0.6 mm to 1 mm, preferably equal or close to 0.8 mm; the pitch between the terminals 34, 35, 44, 45, i.e., the distance between them, is in the range of 9 to 11 mm, preferably equal or close to 10 mm.

To this end, the thermoactuators 3 and 4 are arranged at such a distance as to keep constant the pitch between the respective terminals (those designated 34 and 45 in the drawings), which, in the case of terminals having the above-mentioned dimensions, is in the range of 9 to 11 mm, preferably equal or close to 10 mm.

Considering that in the example of FIGS. 1-19 the thermoactuators 3, 4 are fitted with respective housings 30, 40, the distance between the housing 30 of the two thermoactuators 3 and 4 is in the range of 1 to 5 mm, preferably equal or close to 3 mm.

For this purpose, the shell 2 and/or the cover 21 of the device 1 comprises spacer elements or separators 19, such as walls, ribs or the like, for positioning or securing the thermoactuators 3, 4 at such a distance as to obtain said distance between the respective electric terminals 34, 45.

Figure 2:
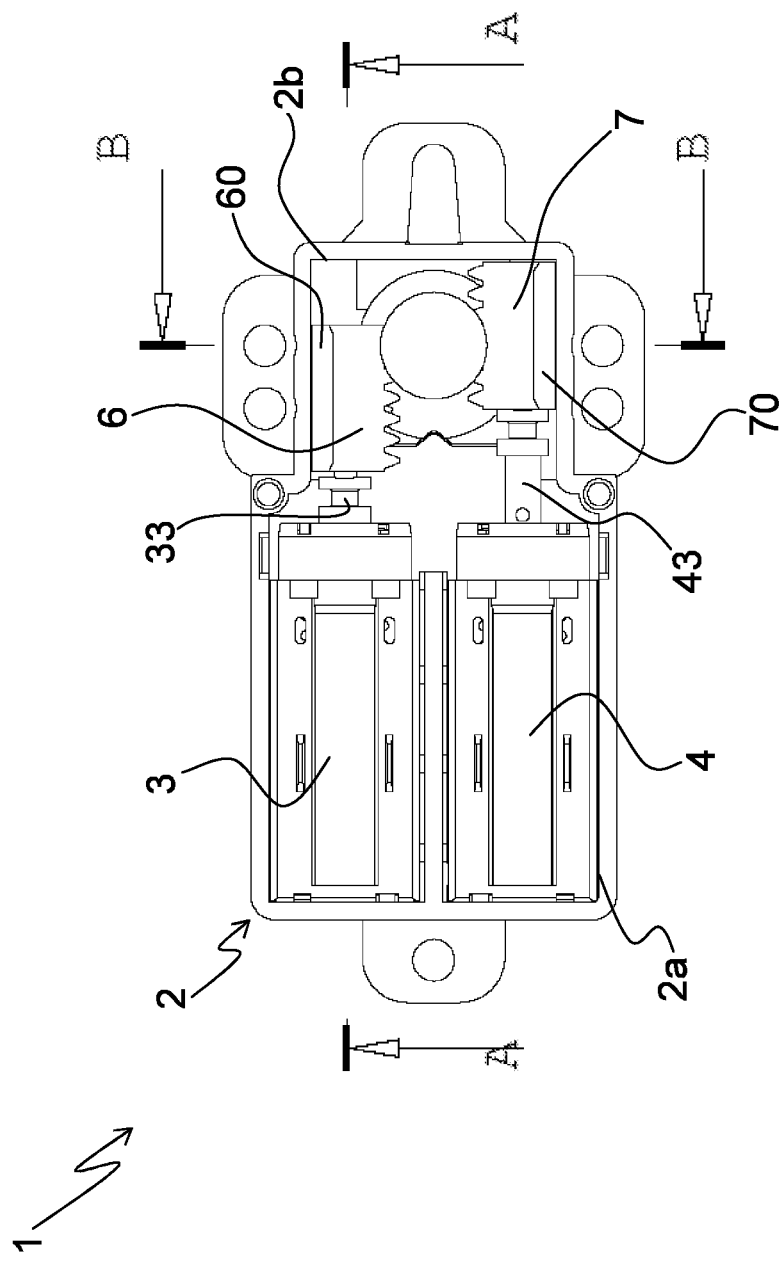
FIG. 2 is a plan view of the actuator device of FIG. 1b.
Figure 3:
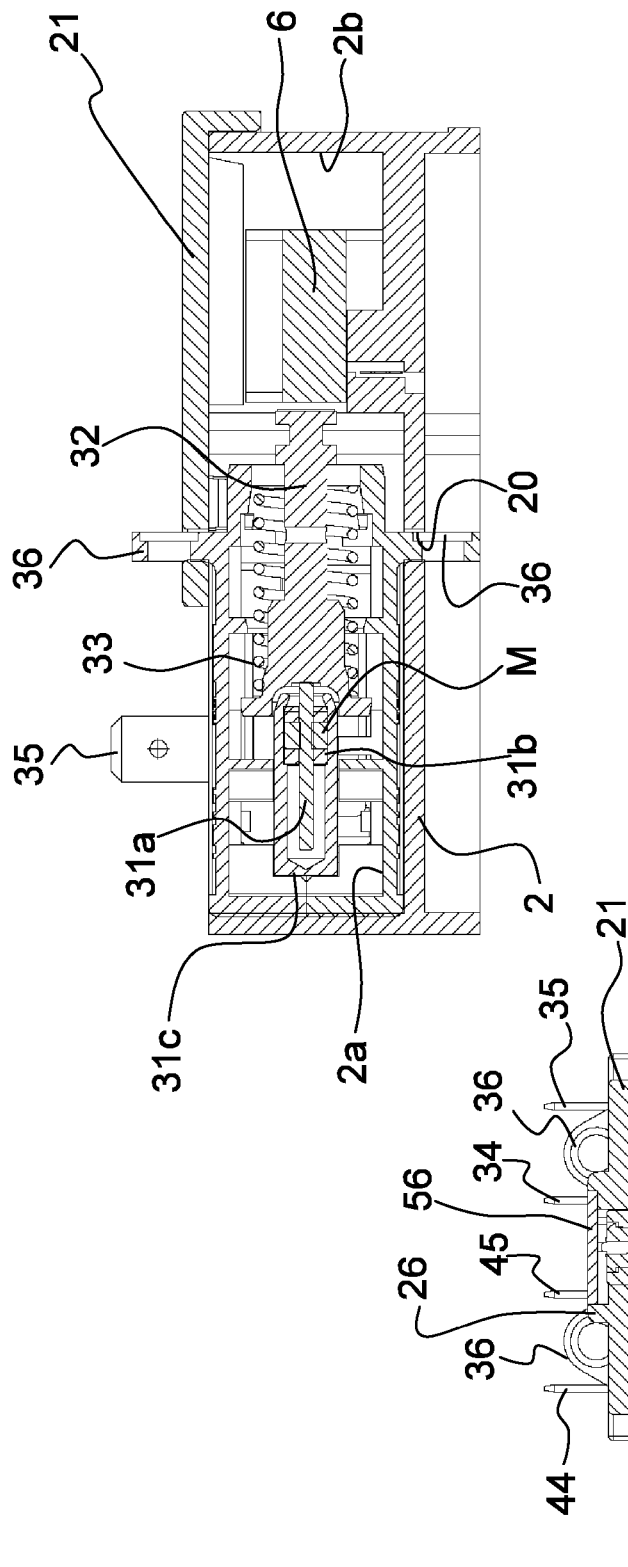
FIGS. 3 and 4 are sectional views along the lines A-A and B-B of FIG. 2, respectively.
Figure 4:
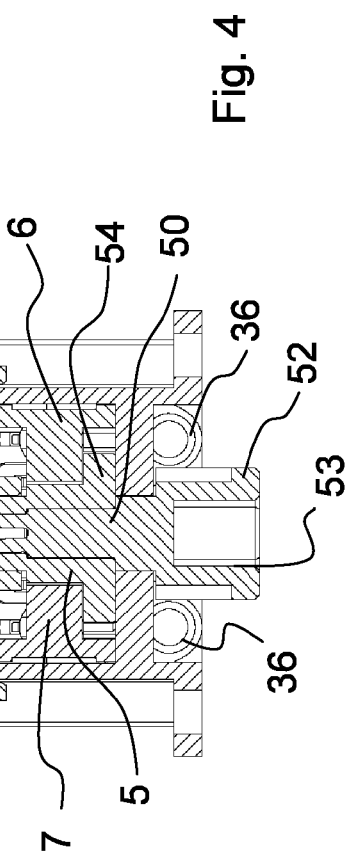
Figure 5:
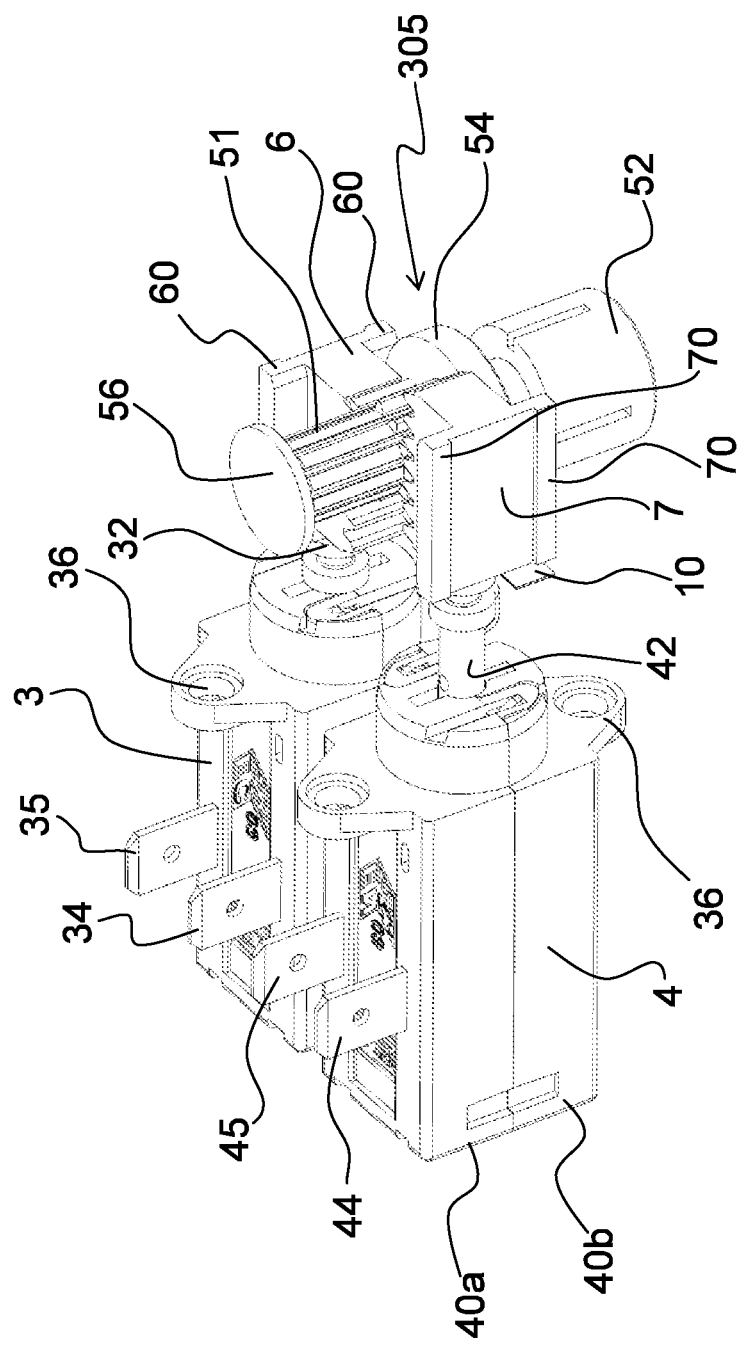
FIGS. 5 and 6 are perspective views showing the device of FIG. 1a, 1b from the top and from the bottom, respectively, with a part removed for clarity.
Figure 6:
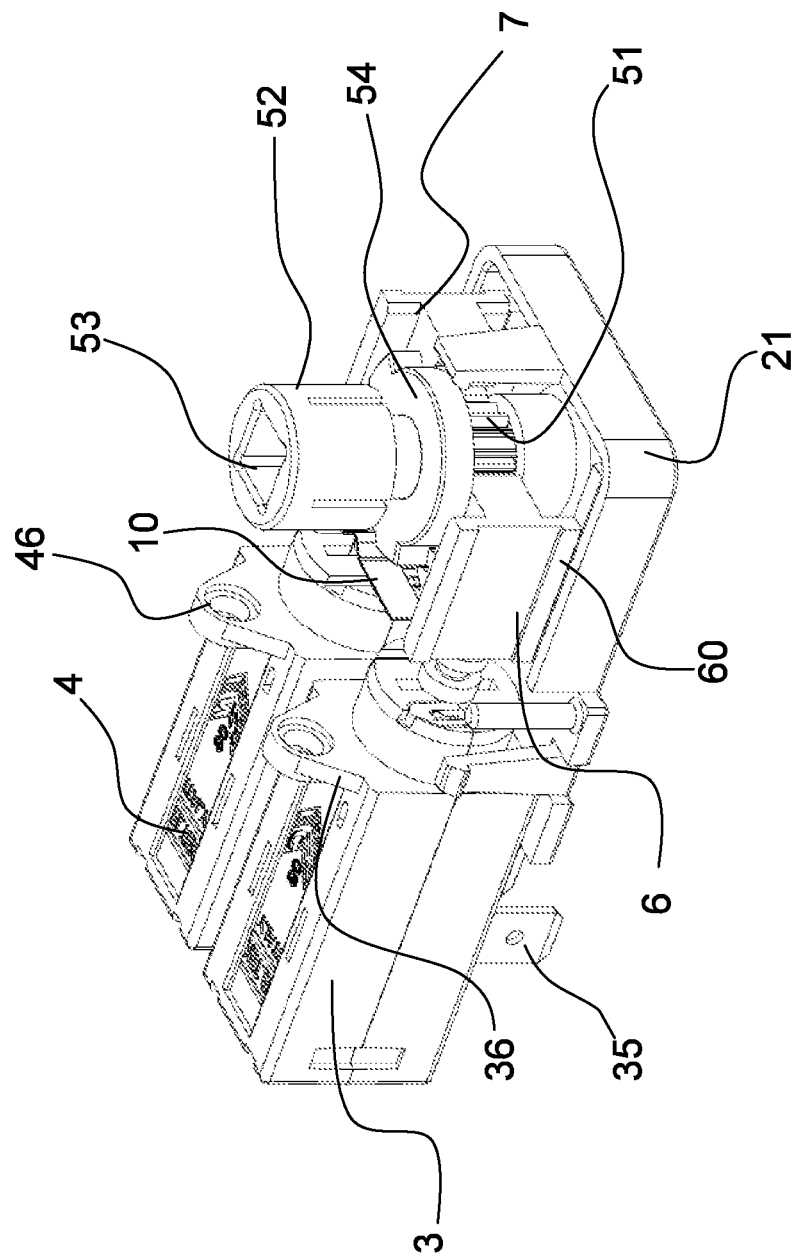

The toothed wheel 51 of the pinion 5 meshes with a pair of racks 6, 7, i.e., transmission elements which move in a substantially linear manner, arranged on opposite sides thereof, the racks 6, 7 being symmetrically or specularly arranged with respect to the axis of said pinion 5 or toothed wheel 51; as clearly shown in FIGS. 2 and 6, the racks 6, 7 are preferably guided, in particular by at least a portion of the housing 2,21, e.g., the side walls of the front portion 2b of the shell 2 and those of the cover 21, against which they abut.

To this end, preferably on the side opposite to that of their teeth 61, 71, the racks 6, 7 have at least one respective guide 60,70, such as pairs of guides 60 and 70, which facilitate their sliding action towards or relative to the shell 2 and/or the cover 21, e.g., the side walls of the shell 2 and of the cover 21.

In the front part 2b of the shell 2 there is also an elastic stop or engagement element 10, such as a leaf spring 10, preferably arranged transversally to the direction of movement of said rack elements 6,7 or thermoactuators 3,4 and located in proximity to the stop disk or element 54 of the pinion 5; the elastic element or spring 10 has a central rib or protuberance 10a, the shape of which is conjugated to that of the cutouts or seats 55', 55" of the disk 54, or an element 10, 10a shaped in a manner such as to engage said cutouts or seats 55', 55" for the purpose of holding the disk 54 and/or the pinion 5 in substantially stable positions.

The device 1 according to the invention operates as follows.

In order to turn the pinion 5 clockwise with reference to a top view of the device 1 (like those of FIGS. 1 and 2), the rack 6 is moved and/or pushed and/or advanced by the corresponding thermoactuator 3.

The latter is then electrically energized through the terminals 34, 35, which supply power to the heater 38, i.e., the electric resistor or PTC resistor 38 arranged in the proximity of or in contact with the thermal assembly 31.

The electric current supplied through the electric terminals 34, 35, 44, 45 to the resistors 38 causes the latter's temperature to rise; as a consequence, the assemblies 31, 41 in contact therewith are heated as well.

This causes the heat-expandable material M contained in the thermal assemblies 31, 41 to expand, which in turn causes the thrust element 31a to move and act upon the stem 32, which comes out of the body 30 of the thermoactuator 3 against the countering force exerted by the spring 33, thus pushing and moving the rack 6.

The travel of each rack 6, 7 is thus substantially equal to that of the corresponding thermoactuator 3, 4 (typically a few millimeters, e.g., in the range of 4 mm to 12 mm or even more), and rotates the pinion 5 by a preset angle as a function of the transmission ratio of the toothing 51, e.g., an angle between 30 degrees and 180 degrees, preferably between 45 degrees and 90 degrees.

Preferably, for obtaining a 90 degree rotation a rotary element or pinion 5,51 with twelve 0.75 module teeth is used, whereas for obtaining a 50 degree rotation a rotary element or pinion 5,51 with twenty-two 0.75 module teeth is used.

In particular, the angle of rotation of the pinion 5 is such as to bring the first cutout or seat 55' in engagement with the rib or protuberance 10a of the spring 10: said engagement, which is a releasable one, allows holding the pinion 5 stably in the achieved condition, even when the thermoactuator 3 is de-energized. It should be noted that the means for mutual engagement or for holding the stable position may also be of another type suitable for this purpose, to be associated with the pinion 5 and/or with the racks 6,7; for example, the pinion 5 and/or the rack 6,7 may be provided with a protuberance 55' and at least one elastic element or spring 10 with a seat 10a.

In fact, as already explained, when the thermoactuator 3 stops being electrically powered, the wax inside the thermal assembly 31 cools down and reduces its volume; consequently, the stem 32 moves backwards, pushed by the force of the elastic return spring 33.

When the stem 32 has gone back in, it no longer exerts a force on the rack 6 and on the pinion 5, which thus remains locked in position by the holding device 55, 10a, i.e. by the engagement between the cutout 55' and the rib 10a of the spring 10. This happens throughout the time required by the operation of the apparatus in which the actuator device 1 is being used.

Thus, for example, in the case of a washing agent dispenser of a household appliance like the one disclosed in the previously mentioned American patent, the time during which the pinion 5 is held in the locked condition depends on the wash cycle, and may therefore last some minutes (e.g., 5-15); consequently, the known thermoactuator must be kept powered as well all the time.

If a thermoactuator according to the invention is adopted, in such time interval none of the thermoactuators 3 and 4 is kept electrically powered, resulting in an evident consumption advantage.

When the pinion 5 must be moved in the opposite direction and/or returned to the previous position, in the device 1 the second thermoactuator 4 is activated which, by operating as described for the other thermoactuator 3, acts upon the second rack 7 through the stem 42.

Figure 7:
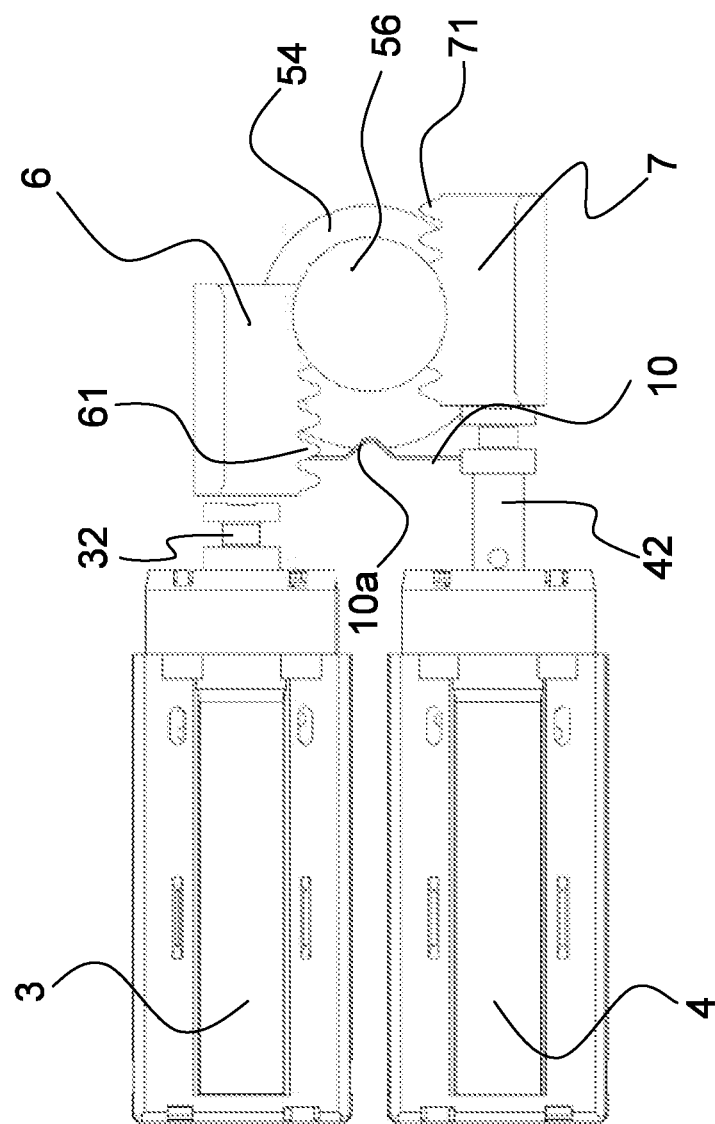
FIGS. 7 and 8 are respective top and bottom views of the device of FIGS. 5 and 6 in a corresponding operating condition.
Figure 8:
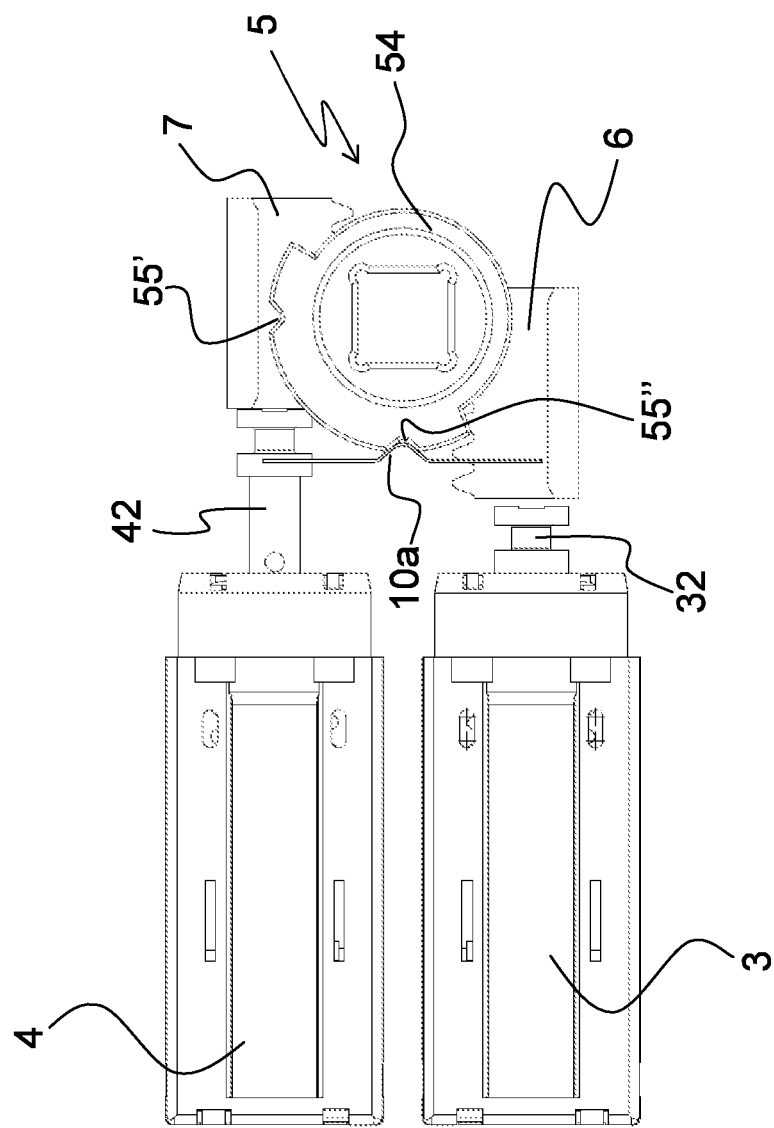
Figure 15:
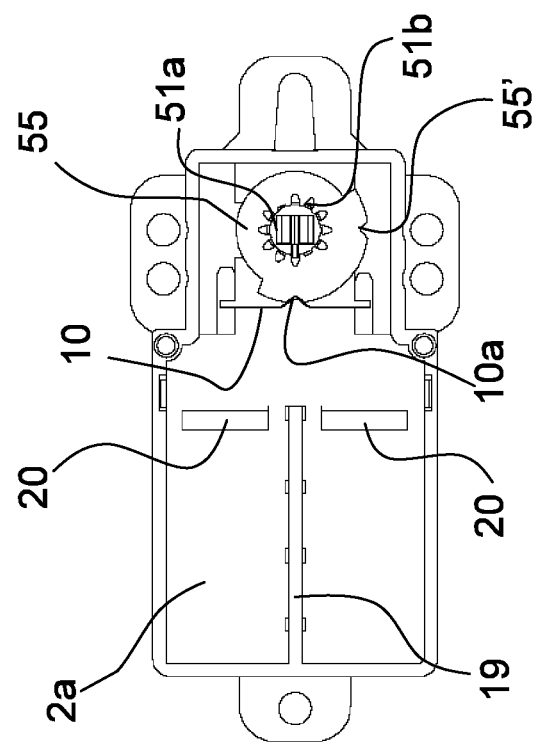
FIGS. 14 and 15 show further details of the device shown in the preceding Figures.
Figure 14:
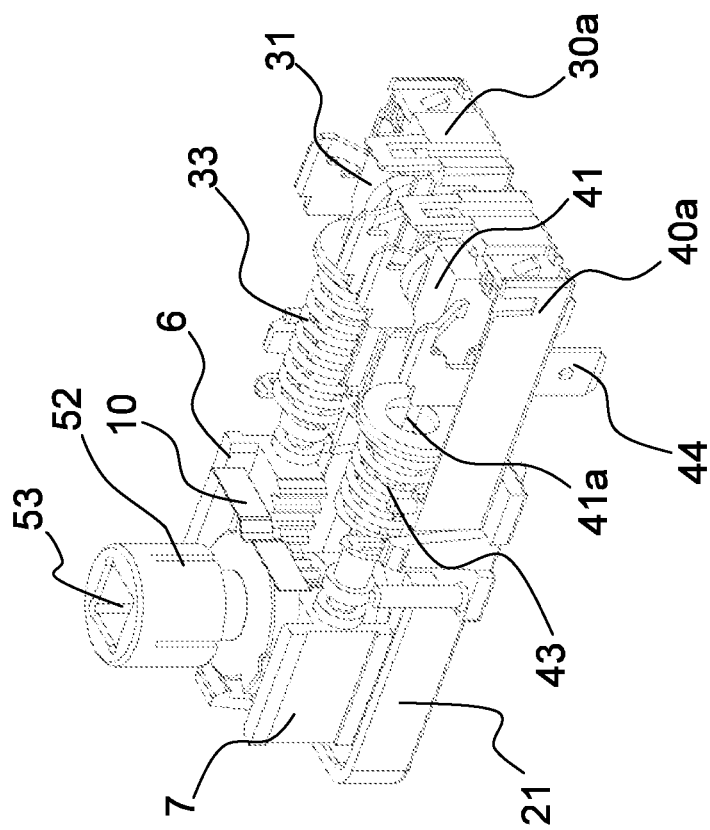

The force applied by the shaft or stem 42 is such as to overcome the locking action exerted by said stop element, i.e., the leaf spring 10 with the disk 54 and its cutout 55', thus causing the pinion 5 to rotate backwards until the second cutout 55" of the disk 54 engages with the rib 10a of the spring 10, as visible in FIGS. 2, 7 and 8.

In this case as well, the travel of the thermoactuator 4 is such as to ensure a preset angle of rotation of the pinion 5, depending on said transmission ratio between its toothing 51 and the toothing of the rack 6, 7.

In this regard, it must also be pointed out that, in accordance with a preferred embodiment, the travel of the rack 7 (as well as that of the other rack 6) advantageously finds an end-of-travel abutment in the back wall of the shell 2 that houses the device 1, as can be seen in FIG. 2, though different abutments or stop elements or end-of-travel elements may also be conceived.

It should also be taken into account that said racks, which are preferably substantially equal or specular, have been preferably described herein as elements adapted to make a linear movement or travel, while also being able, if necessary, to make different movements, such as a slightly arched movement, under the action of said linear thrust exerted by the thermoactuator 3,4, and still being able to engage and rotate said rotary element or pinion 5, 51.

This feature, along with the stable arrangement of the actuators 3, 4 in the rear part 2a of the shell 2 and with the pinion-rack mechanism, allows to obtain a very accurate actuator device 1 that can be used for any application requiring very precise movements.

Also in this case, of course, once the stable advanced holding condition has been reached, i.e., when the cutout 55" has engaged the rib 10a of the leaf spring 10, the second actuator 4 is de-energized and its stem 42 returns into the retracted condition, also because of the action of the elastic return coil spring 43.

It follows that the pinion 5 can remain in that reached condition without power having to be supplied to the thermoactuator 4.

It is apparent from the above description how the device 1 according to the invention can solve the technical problem addressed by the invention.

In fact, as explained above, it allows to hold the pinion 5 in two preset conditions or stable positions without requiring electric power to be continuously supplied to the thermoactuators 3, 4, since the latter need to be powered only for the time strictly necessary for switching the angular position of the rotary element 5,51.

It follows that, from an energetic viewpoint, the consumption of the device 1 is much lower, all conditions being equal, than that of the above-mentioned prior-art devices, in which the thermoactuator must be kept powered as long as the pinion needs to be held in the stable condition.

It must be underlined that this result is attained for both stable conditions of the device, i.e., for both stable angular positions; hence the advantage in this respect is doubled.

It follows that the device 1 combines all the above-mentioned advantages derived from the use of thermal actuators, without the drawbacks due to the necessity of a continuous electric supply.

Said advantages also derive from the fact that the device comprises at least two sliding elements or racks 6,7, preferably parallel and/or opposite and/or specular and/or symmetrical to each other, in particular associated, whether directly or indirectly, with at least one angularly-movable or rotary element or pinion 5, which is adapted to transfer angular or rotary motion to an element external to the device 1.

Said angularly-movable or rotary element, or the pinion 5 with its toothed wheel 51, is preferably interposed between said two sliding elements or racks 6,7; preferably, the teeth 61, 71 or the actuation means 3, 31, 32; 4, 41, 42 of the racks 6,7 are opposite to each other and at least partly engaged with teeth of the pinion 5.

The device 1 is also compact, because the side-by-side arrangement of the thermoactuators 3, 4 minimizes its outer dimensions, for the pinion can advantageously be interposed between the racks 6,7 associated with the respective actuator 3,4; in other words, it can be stated that the outer dimensions of the device 1 according to the invention are only dependent on the dimensions of the two thermoactuators 3, 4, which are arranged side by side, and of the two respective racks 6,7, which are also arranged side by side, in that the pinion can advantageously be positioned between them.

Furthermore, thanks to this arrangement of the actuators, the racks 6, 7 can advantageously be guided by the walls of the housing shell 2, which walls can also be used as abutment elements.

Because of at least some of these features, as already explained, the device 1 turns out to be compact and precise.

Of course, the invention may be subject to a number of variations with respect to the description provided so far.

As aforesaid, it is generally conceivable to replace the engagement system, consisting of the spring 10 and its rib 10a engaging with cutouts 55', 55" on the disk 54, with other releasable engagement means.

For example, one may use a system wherein two leaf springs similar to the one shown in the drawings act upon a respective rack 6, 7, instead of the disk 54.

In such a case, the disk 54 may act as a cam (as opposed to a stop element), so that the device can be integrated with additional functions.

Let us think, for example, of a combination between the disk 54 and electric terminals or angular position sensors of the rotary element or pinion 5, arranged inside the housing shell 2, which are activated or deactivated, i.e., switched, by the disk 54 operating like a cam.

In fact, although the actuator device has been conceived for rotating a pinion between two preset positions, it may however be provided with additional functions, e.g., breaker, switch or the like.

A further possible variant of the invention is shown in FIGS. 20 to 30, wherein for simplicity any elements structurally or functionally equivalent to those already described are designated by the same reference numerals with the addition of 100; thus, for example, the device of this variant is designated as a whole 101 and comprises a shell 102 that houses its components, closed by a cover 121.

In substance, this embodiment differs from the preceding one in that the thermoactuators lack the outer housing 30a, 40a, since the shell 102 and the cover 121 act as a housing themselves.

It follows, therefore, that the thermal units 131, 141 of the thermoactuators are directly housed in the shell 102, which for this purpose has seats or half-cells 113, 114 at the rear portion 102a, configured with transversal 115 and longitudinal 119 walls or ribs that hold the thermal units 131, 141 in position.

Figure 29:
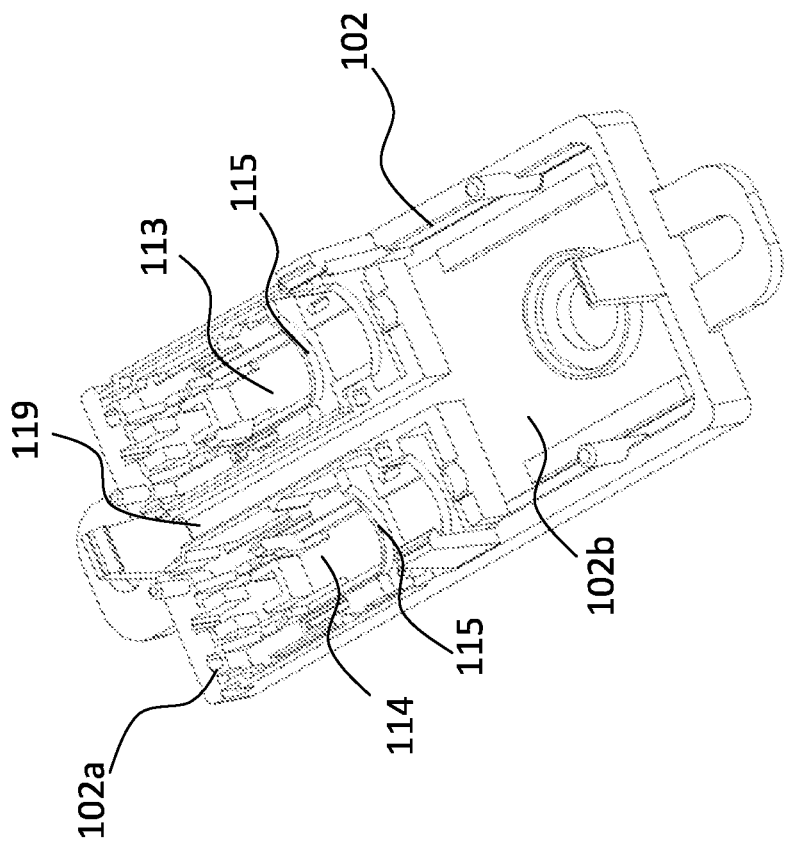
FIGS. 28 and 29 show respective details of the device of FIGS. 20-27.
Figure 28:
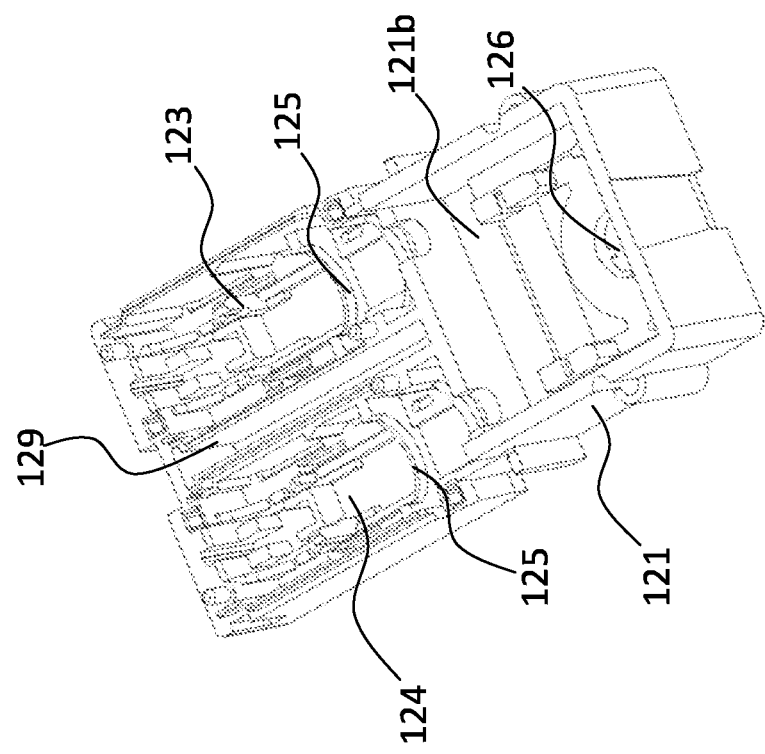
Figure 30:
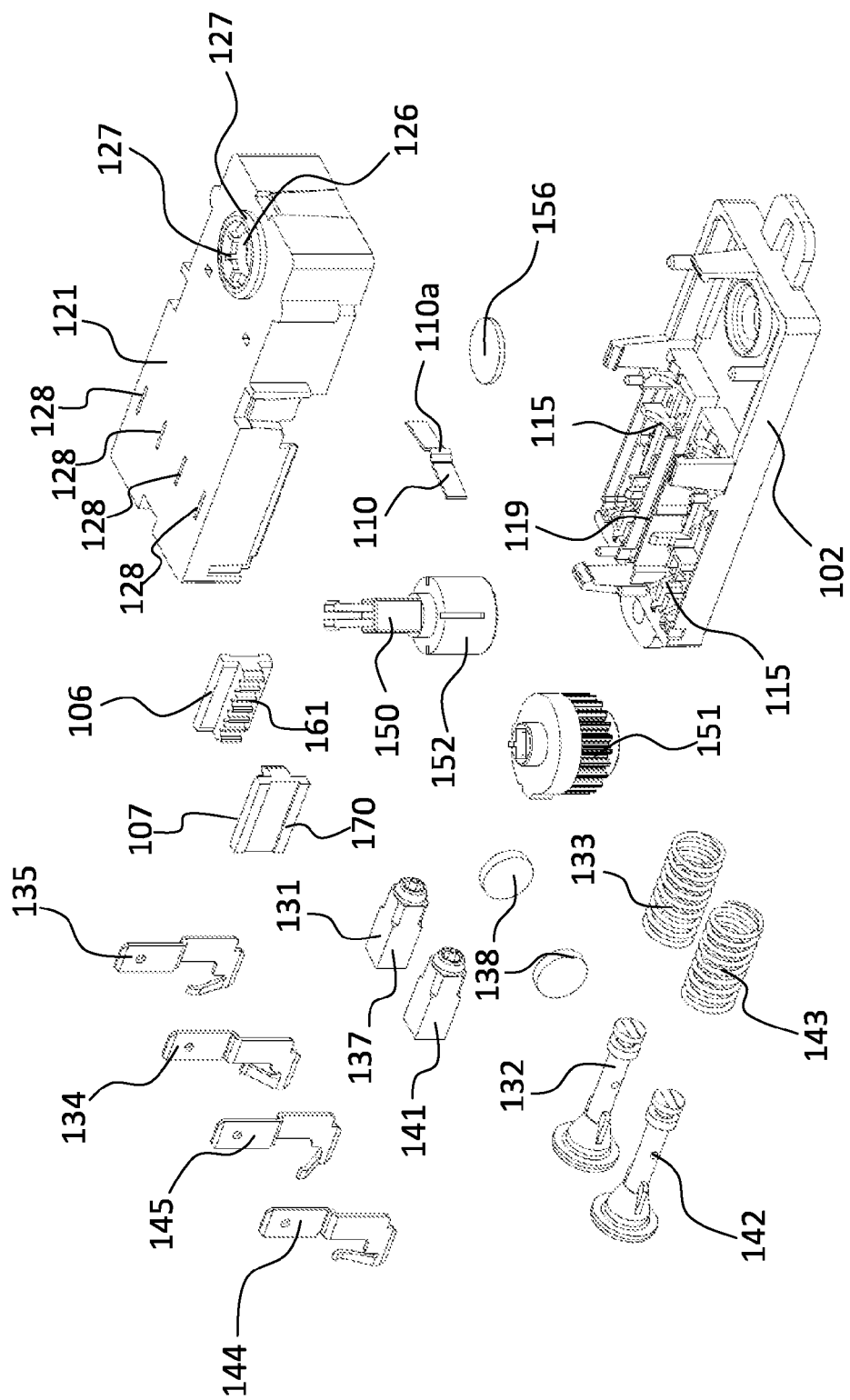
FIG. 30 is an exploded view of the device of FIGS. 20-29.

As clearly shown in FIGS. 28, 29, also the cover 121 has similar seats or half-cells 123, 124 with transversal 125 and longitudinal 129 ribs, so that, when the cover 121 is closing the shell 102, the half-cells form the housings for the thermoactuators, i.e., the housings for at least the respective thermal assemblies 131, 141 and/or the respective repositioning springs 133,143 and/or the respective electric heaters or PTC resistors 138.

It should be noted that the cover 121 also extends over the rear part 102a of the housing 102, where there are the thermal assemblies 131 and 141, with apertures or slots 128 through which the electric terminals 133, 134, 143, 144 can pass; according to a variant not illustrated in the drawings, at least two electric terminals 134, 145 can be made as a single electric terminal contacting both thermal assemblies 131, 141, i.e., an electric terminal shared by at least two thermal assemblies 131, 141. Said at least one electric terminal 133, 144 is provided with elastic contact protuberances facing a respective one or both of the thermal assemblies 131, 141 arranged side by side, in particular with at least one electric terminal 133, 144 at least partly interposed between two adjacent surfaces, preferably flat and parallel to each other, of respective thermal assemblies 131, 141.

In accordance with a preferred embodiment, the thermal assemblies 131, 141 are arranged side by side and/or parallel to each other, and are shaped externally like a parallelepiped on, or include at least one flat side wall 137, 147.

This facilitates the equally spaced arrangement of the electric terminals 134, 135, 144, 145 as previously described.

Unlike the preceding case, in this example the thermal assemblies 131, 141 lack a respective outer housing, which is replaced by the shell 102 and the cover 121 in which they are arranged.

It is therefore the distance between the two thermal assemblies 131, 141 that determines the distance between the terminals 134 and 145, and such distance is preferably predefined in such a way as to equal the distance between the terminals 134 and 135; 144 and 145.

In this case as well, the terminals 134, 135 and 144, 145 are preferably of the flat type, their width being in the range of 6.1 to 6.5 mm, substantially equal or close to 6.3 mm, and their thickness being in the range of 0.6 mm to 1 mm, preferably equal or close to 0.8 mm; the pitch between the terminals 134, 135, 144, 145 is in the range of 9 to 11 mm, preferably equal or close to 10 mm.

To this end, the transversal 115 and longitudinal 119 walls or ribs of the shell 102, as well as the corresponding ones 125, 129 of the cover 121, ensure that the thermal assemblies 131, 141 will be positioned at such a distance that the electric terminals 134, 135, 144, 145 will be equally spaced by a predetermined pitch.

Preferably, said terminals 134, 135, 144, 145 are shaped and spaced in a manner such that one thermal assembly 131, 141 and one heater 138 can be at least partly housed between two adjacent terminals 134, 135 and/or 144, 145. This allows to obtain said 10 mm pitch of the electric connector for a thermal assembly body typically having a 6 mm square cross-section and a PTC heater approximately 2 mm or 2.2 mm thick, arranged side by side in mutual contact, for a total of approximately 8 or 8.2 mm.

For the remaining part, the structure of this variant embodiment of the device is equal or similar to the one previously described, with the pinion 105 driven by the thermoactuators, which in this case are the thermal assemblies 131, 141, through the racks 106, 107.

The pinion 105 comprises the central pin 150 with the base 152, the toothed wheel 151 and the disk 154 with cutouts 155', 155", just like the preceding one, and therefore, for brevity, reference should be made to the above description for further details; the same is true as regards the operation of this variant of the invention, which is similar to the preceding case and will not be described any further; again, reference should be made to the above description for further details.

In this embodiment, the device according to the invention is even more compact, as can also be appreciated in FIGS. 17-27, since the housings 30, 40 of the thermoactuators have been eliminated, or the housings 30 and 40 have been at least partly made as one piece and/or integrated into what in the previous example was the housing 2, 21, in particular with the half-bodies 30b and 40b at least partly integrated into the housing or shell 2 and the half-bodies 30a and 40a at least partly integrated into the housing or cover 21 to form a new housing 102, 121, in particular comprising a shell 102 and a cover 121, with the thermal units 131, 141 directly mounted within the housing 102, 121, or directly mounted within the shell 102 and/or the cover 121.

In accordance with a preferred embodiment of the invention, the housing defined by the shell 102 together with the cover 121 also accommodates the stems 132, 142 associated with the thermal assemblies 131, 141, as well as the elastic return coil springs 133, 143 and the electric heaters 138 or PTC resistors, plus the racks 106, 107, the pinion 105 with the toothed wheel 151 and the pin 150, and the stopping means 110, 155', 155" of the latter.

As can be easily understood, this provides protection for the entire mechanism of the device according to the invention, with apparent advantages in terms of reliability and safety, since the risk that a person might be injured by the movable parts of the mechanism is eliminated.

Attention should also be drawn to the fact that also in this variant of the invention it is possible to apply a connector 80 like the one already described.

Therefore, in the light of this observation, the connector 80 is preferably complementary, and comprises an external structure 81 for housing the terminals 82, which is fitted with engagement means 83, 84 to be engaged with wings of the cover 121, similar to the wings 22, 23 present on the cover 21 of the device of FIGS. 17, 18, 19.

To avoid repetitions, reference should be made to the above description as concerns the connector 80 and how it is applied to the device.

In this context, it must be taken into account that further variants are also possible as concerns the operation of some elements of the device.

In fact, although in the above examples reference has been made to thermoactuators 3, 4 and thermal assemblies 31, 41; 131, 141, which exert and thrust action on the stems 32, 42; 132, 142 and the racks 6, 7; 106, 107, it must nevertheless be pointed out that variants of the invention are also conceivable wherein the actuators perform an action in the opposite direction, i.e., a pulling action.

Let us consider the case wherein, with reference to the arrangement shown in the drawings, when the actuators 3, 4; 131, 141 are in an idle condition the stems 32, 42; 132, 142 are in an advanced position with respect to the thermal assemblies 31, 41; 131, 141 and, when the latter are electrically powered, the stems are retracted and the racks 5,6; 105, 106 move integrally therewith; to this end, the racks are connected to the stems, preferably in such a way that the stem can exert a pulling action on the rack while still being free to move in the opposite direction, in particular so that the stem can return to the idle position while the rack stays in the working position.

In order to implement such a variant, it is sufficient that the thermal assemblies 131, 141 are rotated, i.e., oriented in a thrust direction opposite to that of the case previously considered. In this case, also the springs 33, 43; 133, 143 will exert a return action opposite to that of the above-described examples.

In this regard, it must be pointed out that the thermal actuators, which have been described herein in preferred examples as being substantially linear wax actuators, may also be of another kind, such as different thermal and/or electrothermal actuators still suitable for imparting said substantially linear (or slightly curved) motion to the transmission members or racks 6, 7.

For example, the actuators may be of the bimetal or shape-memory alloy type, and may be associated with heaters conceptually similar to those already described (resistors or PTC resistors), or they may be heated individually in a different way, e.g., by circulating an electric current directly in the electrothermal element, such as a shape-memory alloy wire.

The latter will contract when heated, thus pulling a respective rack (e.g., the wire being connected to the rack and to the housing 2), possibly with the addition of an elastic return element or spring; in the bimetal case, it may be a leaf-spring element which changes its curvature when its temperature rises, and which is adapted to transform said curvature variation into linear motion for translating the rack, etc.; for example, a rack resting on the intermediate point of the leaf spring.

Finally, it must be pointed out that, although in the above-described examples and variants reference has been made to actuator devices producing rotary motion, the principles of the invention are also applicable to devices producing a different type of motion, e.g., angular motion.

Let us think, for example, of a slider being alternately driven by the movements of at least one of the racks controlled by at least one of the thermoactuators discussed above.

All these possible solutions, just like the preceding ones, fall within the scope of the following claims, the text of which is an integral part of the present description.

They may find application in household appliances and/or environmental conditioning and heating apparatuses and/or vehicles and/or automatisms in general; for example, for controlling the position of flaps or valves with rotary obstructors, etc.

What is claimed is:

1. An actuator device for actuating a member movable between at least two stable-positions, comprising:
    a movable member having a first position and a second position;
    a pair of thermal actuators engaged with the movable member, the pair of thermal actuators comprising heat-expandable material that can be alternately activated for actuating the movable member back and forth between the first and second positions; and
    releasable engagement means for holding the movable member in said first and second positions;
    wherein the releasable engagement means comprise an elastic stop element which engages with the moveable member when the movable member is in the first or second positions;
    wherein the engagement is released under the action of the thermal actuators; and
    wherein the movable member comprises a pinion or rotary or angularly-moveable element with which is associated a disk or element cooperating with or being engaged by the elastic stop element.

2. The device according to claim 1, wherein the motion of the movable member is of the rotary and/or angular and/or sliding type.

3. The device according to claim 1, wherein the thermal actuators are arranged side by side or parallel to each other.

4. The device according to claim 3, wherein the movable member is arranged between working directions of the thermal actuators.

5. The device according to claim 1, wherein the thermal actuators comprise:
    a stem alternately movable between a first retracted position and a second advanced position, and
    wherein a wall of a shell that houses the thermal actuators is used as an abutment element for the movement of the stem.

6. The device according to claim 1, wherein the movable member further comprises a rack or sliding member that engages the pinion or rotary or angularly-movable element.

7. The device according to claim 6, wherein the rack or sliding member is at least partly guided by walls or portions of a body or housing that house the rack or sliding member.

8. The device according to claim 1, comprising a shell or housing at least partly closed by a cover, which houses the thermal actuators, wherein the shell and the cover provide at least partly for an outer housing for the actuators.

9. The device according to claim 1, comprising a housing that houses at least partly the thermal actuators and the movable member, wherein the device comprises means for detecting the position of the movable member that includes at least one of:
    a seat or a hole in the housing;
    references or notches;
    means for excitation;
    means for sensing.

10. The device according to claim 9, wherein the means for excitation comprises cam means and/or magnetic elements or permanent magnets and/or optical elements.

11. The device according to claim 1, wherein the thermal actuators are active upon respective racks or sliding elements that mesh with or couple to the pinion or rotary or angularly-movable element, on opposite sides thereof.

12. The device according to claim 1, wherein said thermal actuators comprise at least one of:
    an element expanding and/or contracting in accordance with temperature changes;
    a wax or a bimetal or a shape-memory alloy material;
    an electric heating element or a PTC resistor;
    electric terminals for supplying power to and/or actuating the actuator;
    at least one linearly-movable thrust element;
    at least one stem linearly movable by the thrust element;
    at least one elastic element or spring associated with the thermal actuators for the elastic return thereof.

13. The device according to claim 1, wherein said thermal actuators comprise respective electric terminals arranged at the same distance, so that there is a uniform distance or pitch between the terminals for the purpose of coupling to an electric connector.

14. The device according to claim 13, comprising at least one of the following:
    said thermal actuators include respective outer housings arranged in a housing of the device, in which there are means for the mutual positioning of the actuators, so that said electric terminals are at said equal distance;
    said thermal actuators are housed in a housing of the device, in which there are means for the mutual positioning of the assemblies, so that said electric terminals are at said equal distance.

15. The device according to claim 1, comprising at least one of the following:
    a housing that houses the thermal actuators and comprises engagement means that engage with a connector when the latter is mounted on the device;
    means for ensuring a univocal and/or coded coupling with respect to an electric connector;
    means for engaging with a connector when the latter is mounted on the device, comprising wings extending from the housing, and univocal and/or coded coupling means comprising a seat, which is used as a guide and/or key or coding for a respective rib provided on the structure of the connector, or vice versa.

16. The device according to claim 1, wherein each of the thermal actuators comprise:
    a body that houses the heat-expandable material; and
    an elongated thrust element that comes forward out of the body when the heat-expandable material is heated.

17. The actuator device according to claim 16, wherein the heat-expandable material comprises wax.

18. An actuator device comprising:
    a movable member comprising a pinion and an associated disk or element that are rotatable between a first position and a second position;
    a stop element that engages with the disk or element of the movable member and holds the movable member stable in the first position and the second position;
    a movable first rack engaged with the movable member on a first side of the pinion;
    a movable second rack engaged with the movable member on a second side of the pinion;
    a first thermal actuator comprising a heat-expandable material that when activated expands to move the first rack causing the movable member to rotate in a first direction to the first position, the movable member being held stable in the first position by the stop member when the first thermal actuator is not activated; and
    a second thermal actuator comprising heat-expandable material that when activated expands to move the second rack causing the movable member to rotate in a second direction to the second position, the second direction being opposite the first direction, the movable member being held stable in the second position by the stop member when the second thermal actuator is not activated.

19. The actuator device according to claim 18, wherein the first thermal actuator comprises:
    a body that houses the heat-expandable material that expands when heated; and
    an elongated thrust element that expands out of the body when the heat-expandable material is heated.

20. The actuator device according to claim 19, wherein the heat-expandable material comprises wax.

21. The actuator device according to claim 19, wherein the first thermal actuator further comprises a spring that retracts the thrust element back into the body when the first thermal actuator is deactivated.

22. A method for actuating a movable member between at least two stable positions, comprising:
    providing first and second thermal actuators engaged with a movable member, the movable member comprising a pinion or rotary or angularly-moveable element with which is associated a disk or element, the first and second thermal actuators comprising heat-expandable material;
    energizing the first thermal actuator to rotate the movable member to a first position;
    de-energizing the first thermal actuator;
    holding the movable member stable in the first position by an elastic stop element engaging the disk or element of the movable member while the first thermal actuator is de-energized;
    energizing the second thermal actuator to rotate the movable member to a second position;
    de-energizing the second thermal actuator; and
    holding the movable member stable in the second position by the elastic stop element engaging the disk or element of the movable member while the second thermal actuator is de-energized.

* * * * *